United States Patent
Marmignon

(10) Patent No.: US 10,832,213 B2
(45) Date of Patent: Nov. 10, 2020

(54) SYSTEM AND METHOD FOR MANAGING A WORKSPACE ENVIRONMENT OF A COMPUTER PROCESSING SYSTEM

(71) Applicant: CITRIX SYSTEMS, INC., Fort Lauderdale, FL (US)

(72) Inventor: Pierre Marmignon, Bry (FR)

(73) Assignee: CITRIX SYSTEMS, INC., Fort Lauderdale, FL (US)

(*) Notice: Subject to any disclaimer, the term of this patent is extended or adjusted under 35 U.S.C. 154(b) by 309 days.

(21) Appl. No.: 15/726,521

(22) Filed: Oct. 6, 2017

(65) Prior Publication Data

US 2019/0108059 A1    Apr. 11, 2019

(51) Int. Cl.

| G06F 9/46 | (2006.01) |
|---|---|
| G06Q 10/10 | (2012.01) |
| G06F 9/52 | (2006.01) |
| G06F 9/48 | (2006.01) |
| G06F 9/50 | (2006.01) |
| H04L 29/08 | (2006.01) |

(52) U.S. Cl.
CPC .............. *G06Q 10/10* (2013.01); *G06F 9/48* (2013.01); *G06F 9/50* (2013.01); *G06F 9/52* (2013.01); *H04L 29/08* (2013.01)

(58) Field of Classification Search
None
See application file for complete search history.

(56) References Cited

U.S. PATENT DOCUMENTS

| 9,286,130 | B2* | 3/2016 | Ashok .................. G06F 9/5077 |
| 10,089,135 | B2* | 10/2018 | Karve ................. G06F 9/45558 |
| 2005/0204198 | A1 | 9/2005 | Pagan | |
| 2006/0136490 | A1* | 6/2006 | Aggarwal ............. G06Q 10/06 707/999.103 |
| 2012/0089980 | A1* | 4/2012 | Sharp .................. G06F 9/45558 718/1 |
| 2013/0014023 | A1 | 1/2013 | Lee et al. |
| 2014/0237550 | A1 | 8/2014 | Anderson et al. |
| 2016/0077674 | A1 | 3/2016 | Forster et al. |
| 2017/0041296 | A1 | 2/2017 | Ford et al. |
| 2017/0262779 | A1 | 9/2017 | Remaker |

* cited by examiner

*Primary Examiner* — Bing Zhao
(74) *Attorney, Agent, or Firm* — Allen, Dyer, Doppelt + Gilchrist, PA

(57) ABSTRACT

A computer processing system includes at least one processor to operate based on an operating system, and to detect when a user session is opened. The computer processing system includes a workspace environment management engine to manage a workspace environment of the computer processing system in response to detecting when the user session is opened. The workspace environment management engine identifies if an engine configuration repository of tasks and settings to be performed include a new task or setting that is not in a saved configuration repository. If a new task or setting has been identified, then the workspace environment management engine performs the new task or setting for the workspace environment.

18 Claims, 3 Drawing Sheets

SYSTEM AND METHOD FOR MANAGING A WORKSPACE ENVIRONMENT OF A COMPUTER PROCESSING SYSTEM

TECHNICAL FIELD

The present disclosure relates to the field of computing devices, and more particularly, to managing a user's workspace environment of a computer processing system.

BACKGROUND

In a Windows based environment, users log into and access a desktop managed by a shell. The shell provides tools for running applications, managing an operating system, accessing physical resources, etc. Unlike the shell, the desktop provides a comprehensive workspace interface (e.g., icons, windows, start menu, etc.) allowing users to access their applications and resources (e.g., files, printers, networks).

When application virtualization is used, the shell is still running but is not displaying a desktop interface. Users are only able to see and use the virtual applications they are launching through an application virtualization solution.

In Enterprise environments, for users to be able to use their workspace, a number of settings, usually related to the applications they are using, need to be customized. This customization includes, for example, printers to be connected, network drives to be mapped, application shortcuts to be created, and shell settings to be set, such as registry values or environmental variables.

Tools/products exist for configuring these settings. However, these tools are administrator centric and allow management of the shell settings without focusing on the user experience. That is, they usually generate long login times, or trade-off a better login time for slow application launch because customizations will be applied at launch. Users, however, are unsatisfied with such delays and want the desktop to be available as soon as possible, login times to be minimized, and applications to launch as fast as possible.

SUMMARY

A computer processing system includes at least one processor configured to operate based on an operating system and to detect when a user session is opened, and a workspace environment management engine. The workspace environment management engine may be configured to manage the workspace environment in response to detecting when the user session is opened.

More particularly, the workspace environment management engine may access an engine configuration repository that includes a list of workspace tasks and settings to be performed for the workspace environment, and compare the list of workspace tasks and settings in the engine configuration repository to a saved configuration repository that includes a list of workspace tasks and settings that have already been performed for the workspace environment. The workspace environment management engine may then identify, based on the compare, if the engine configuration repository includes at least one new task or setting that is not in the saved configuration repository. If at least one new task or setting has been identified, then the workspace environment management engine may perform the at least one new task or setting for the workspace environment.

The workspace environment management engine advantageously decreases login times and application launch times by performing tasks or settings that are identified as being new, while not performing the tasks and settings that have already been performed as reflected in the saved configuration repository.

The workspace environment management engine may comprise a history module configured to update the saved configuration repository with the new task or setting if successfully performed for the workspace environment. The history module may be further configured to perform the compare and identify functions of the workspace environment management engine.

The workspace environment management engine may further comprise a processing module configured to receive the at least one new task or setting to be performed, and a computing module configured to process multiple threads in parallel so as to perform the at least one new task or setting, with the computing module having a cap limit on how many threads can be processed in parallel. The cap limit advantageously helps the workspace environment management engine to consume a limited amount of resources so as to have a reduced footprint depending on the executing environment.

The new task or setting to be performed may comprise a plurality of new tasks or settings to be performed. The computing module may be further configured to schedule an order for processing the multiple threads for the plurality of tasks or settings to be performed based on the cap limit.

Another aspect is directed to a method for operating a computer processing system with a workspace environment management engine as described above. The method includes detecting when a user session is opened on the computer processing system, and operating a workspace environment management engine to manage a workspace environment of the computer processing system, in response to detecting when the user session is opened. The method may further include accessing an engine configuration repository that includes a list of workspace tasks and settings to be performed for the workspace environment, and comparing the list of workspace tasks and settings in the engine configuration repository to a saved configuration repository that includes a list of workspace tasks and settings that have already been performed for the workspace environment. The method may further include identifying, based on the compare, if the engine configuration repository includes at least one new task or setting that is not in the saved configuration repository. If at least one new task or setting has been identified, then the at least one new task or setting may be performed for the workspace environment.

Yet another aspect is directed to a non-transitory computer readable medium for a computer processing system, with the non-transitory computer readable medium having a plurality of computer executable instructions for causing the computer processing system to perform steps including operating a workspace environment management engine to manage a workspace environment of the computer processing system, in response to detecting when the user session is opened. Operating the workspace environment management engine may include accessing an engine configuration repository that includes a list of workspace tasks and settings to be performed for the workspace environment, and comparing the list of workspace tasks and settings in the engine configuration repository to a saved configuration repository that includes a list of workspace tasks and settings that have already been performed for the workspace environment. The workspace environment management engine may identify, based on the compare, if the engine configuration repository includes at least one new task or setting that is not in the saved configuration repository. If at least one new task or setting has been identified, then the at least one new task or setting is performed for the workspace environment.

BRIEF DESCRIPTION OF THE DRAWINGS

The present disclosure will be understood more fully from the detailed description given below and from the accompanying drawings of various embodiments of the disclosure, which, however, should not be taken to limit the invention to the specific embodiments, but are for explanation and understanding only.

DETAILED DESCRIPTION

Figure 1:
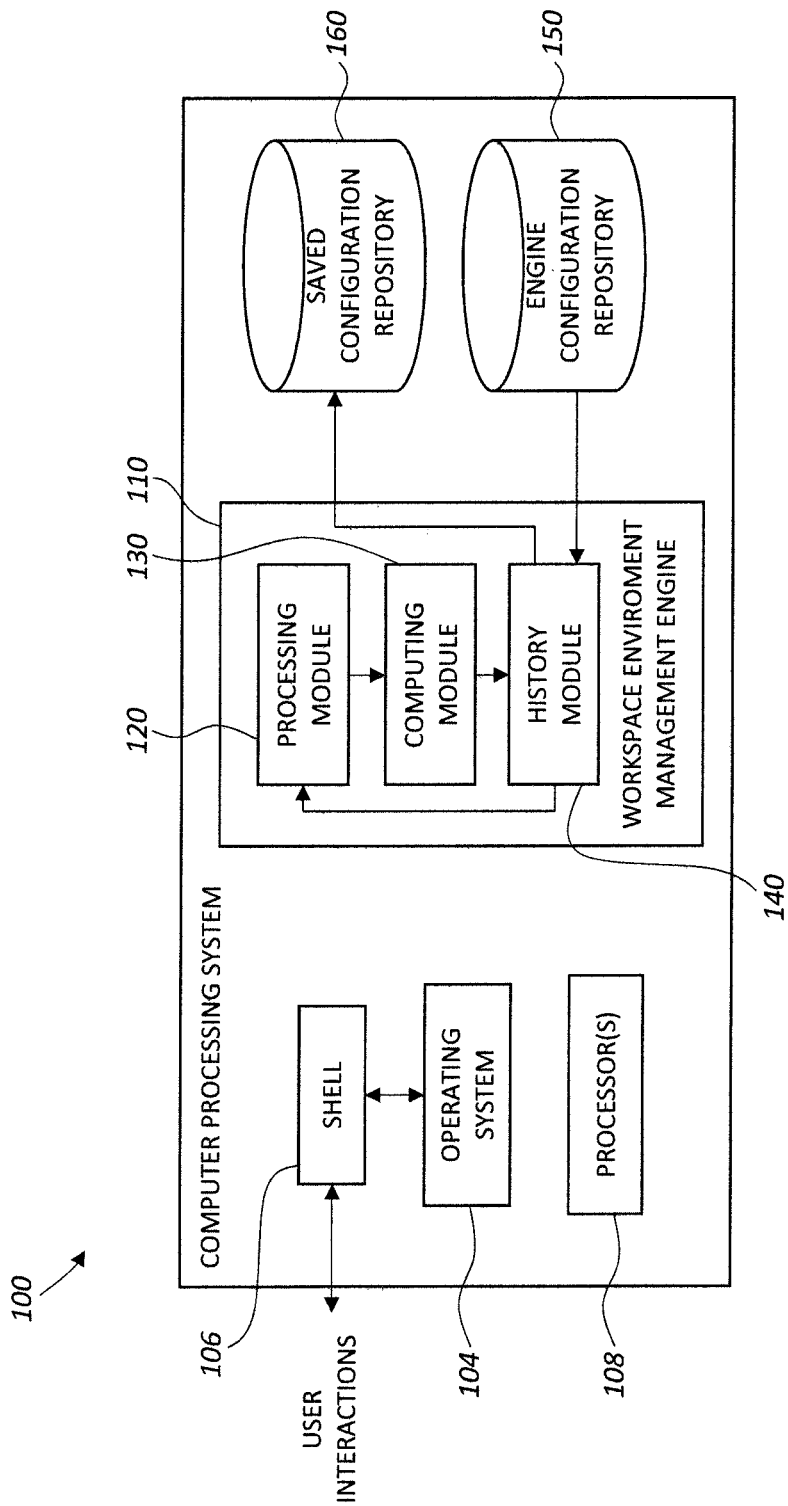
FIG. 1 is a block diagram of a computing processing system with a workspace environment management engine in accordance with the present disclosure.

The present description is made with reference to the accompanying drawings, in which exemplary embodiments are shown. However, many different embodiments may be used, and thus the description should not be construed as limited to the particular embodiments set forth herein. Rather, these embodiments are provided so that this disclosure will be thorough and complete. Like numbers refer to like elements throughout, and prime notations are used to indicate similar elements in alternate embodiments.

As discussed in greater detail below, a workspace environment management engine for a computer processing system is described. The workspace environment management engine improves a user's experience, such as decreasing login times, decreasing application launch times, and preventing timeout delays. Customizations to the workspace environment may be applied at login in a fast and intelligent way to ensure fast application launch, thereby improving user experience.

In the following description, numerous details are set forth. It will be apparent, however, to one of ordinary skill in the art having the benefit of this disclosure, that the present disclosure may be practiced without these specific details. In some instances, well-known structures and devices are shown in block diagram form, rather than in detail, in order to avoid obscuring the present disclosure.

Some portions of the detailed description that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as generating, converting, executing, storing, receiving, obtaining, constructing, accessing, capturing, or the like, refer to the actions and processes of a computer processing system, or a similar electronic computing device, that manipulates and transforms data represented as physical (e.g., electronic) quantities within the computer processing system's registers and memories into other data similarly represented as physical quantities within the computer processing system memories or registers or other such information storage, transmission or display devices.

The present disclosure also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

The algorithms and displays presented herein are not inherently related to any particular computer or other apparatus. Various general-purpose systems may be used with programs in accordance with the teachings herein, or it may prove convenient to construct a more specialized apparatus to perform the required method steps. The required structure for a variety of these systems will appear from the description below. In addition, the present disclosure is not described with reference to any particular programming language. It will be appreciated that a variety of programming languages may be used to implement the teachings of the disclosure as described herein.

Referring now to FIG. 1, a computer processing system 100 with a workspace environment management engine 110 is provided. The computer processing system 100 includes computing resources, such as one or more processors 108, memory, user input output devices, etc. An operating system 104 is run by the resources of the computer processing system 100, and includes a shell 106 that manages a graphical user interface to the operating system 104. The shell 106 allows management of a start menu, taskbar, desktop, and file manager. In one embodiment, the operating system 104 is a Microsoft™ Windows™ operating system having an explorer.exe shell.

The workspace environment management engine 110 manages the user experience associated with the workspace environment provided by the shell 106, such as managing the scheduling of tasks, and maintaining histories of settings for the user's workspace environment, maintaining execution details, preventing timeouts, etc., or otherwise maintaining configuration settings for one or more applications.

The workspace environment management engine 110 includes a processing module 120, a computing module 130, and a history module 140. These modules may be implemented using hardware (circuitry, dedicated logic, etc.), software (such as is run on a general purpose computer system or a dedicated machine), firmware, or a combination thereof.

Still referring to FIG. 1, the processor 108 is configured to operate based on the operating system 104, and to detect when a user session is opened. The operating system 104 includes a user graphical interface allowing access to a workspace environment of the computer processing system 100. The workspace environment management engine 110 is configured to manage a workspace environment of the computer processing system 100, in response to detecting when the user session is opened, by performing certain steps.

These steps include the workspace environment management engine 110 accessing an engine configuration repository 150 that includes a list of workspace tasks and settings to be performed for the workspace environment, and comparing the list of workspace tasks and settings in the engine configuration repository 150 to a saved configuration repository 160 that includes a list of workspace tasks and settings that have already been performed for the workspace environment. The workspace environment management engine 110 then identifies, based on the comparing, if the engine configuration repository 150 includes at least one new task or setting that is not in the saved configuration repository 160. If at least one new task or setting has been identified, then the workspace environment management engine 110 performs the at least one new task or setting for the workspace environment. The at least one new task or setting to be identified may include updates to the workspace tasks and settings stored in the engine configuration repository 150.

The workspace environment management engine 110 advantageously decreases login times and application launch times by performing tasks or settings that are identified as being new, while not performing the tasks and settings that have already been performed as reflected in the saved configuration repository 160.

The engine configuration repository 150 may be located with the computer processing system 100. Alternatively, the engine configuration repository 150 may be located remotely from the computer processing system 100.

Within the workspace environment management engine 110, the history module is configured to update the saved configuration repository 160 with the new task or setting if successfully performed for the workspace environment. The history module 140 is further configured to perform the comparing and identifying functions of the workspace environment management engine 110.

Within the workspace environment management engine 110, the processing module 120 is configured to receive from the history module 140 the new task or setting to be performed. The computing module 130 is configured to process multiple threads in parallel so as to perform the new task or setting, with the computing module 130 having a cap limit on how many threads can be processed in parallel.

The new task or setting to be performed may include a plurality of new tasks or settings to be performed, for example. In this case, the computing module 130 is further configured to schedule an order for processing the multiple threads for the plurality of new tasks or settings to be performed based on the cap limit.

In other words, applications run by the shell 106 can use multiple processing threads to have faster processing. When an application is using multiple threads, it can process a number of tasks or settings in parallel. While multithreading is good because it allows for faster processing, a process managing the workspace environment management engine 110 has to be careful about its own footprint and not become the process consuming most of the available resources which are key for a good user experience. While managing user workspace settings, some sense of order may be required (e.g., define a variable that depends on another variable that would have to be created first).

As every thread in a program is to be processed or performed, the computing module 130 enables resource parallelism to be used while ensuring that execution orders are preserved. The computing module 130 ensures that when an application configuring user workspace settings is running on a specific computer processing system 100, it is using a capped number of threads defined by the available resources on the computer processing system 100 while respecting execution orders.

This maximum value may be called the maximum degree of parallelism, and its default value is the number of processors(s) or processor core(s) within the computer processing system 100 multiplied by 2. This maximum value can be manually overridden by lowering the value. Furthermore, the computing module 130 may also prevent an increase above the maximum degree of parallelism to ensure a relative footprint size.

The computing module 130 will receive a list of the new tasks or settings that it is to process. This list will then be ordered according to configured orders and partitioned (if applicable) in chunks, with each chunk containing all items with the same execution order level. The computing module 130 may also be referred to as a scheduling module.

For each chunk, the computing module 130 will schedule parallel task execution according to the maximum degree of parallelism. For example, if the maximum degree of parallelism is 4, the computing module 130 will schedule tasks 4 by 4 and execute them concurrently (in 4 threads). The computing module 130 will then wait until the tasks have been completed to start the remaining ones, using the same algorithm. Scheduling and computing of the new tasks to be performed is done while using as many threads as the workspace environment management engine 110 can handle with a reasonable footprint.

The history module 140 is responsible for ensuring consistency and allowing a user workspace to be dynamic. Typical workspace management settings solutions process settings which have a huge cost in consumed resources (CPU, Memory) of the computer processing system 100, also greatly impacts login times thereby effecting user experience.

While keeping track of every execution might make sense, if the history module 140 has been executing multiple times for a long period, reading/updating a history can increase in complexity as the size of the history increases.

The history module 140 stores details of previously processed workspace settings and/or user workspace configuration settings that have been assigned to machines, users, or groups.

The history module 140 stores previous execution details about successfully processed settings as performed by the computing module 130 for the workspace environment. Every time a task or setting is processed by the workspace environment management engine 110, task/setting details are stored on a persistent storage of the computer processing system 100, such as in the saved configuration repository 160. This way the workspace environment management engine 110 will then be able to process only tasks/settings that have been updated, changed, or removed by the history module 140 in the saved configuration repository 160.

In one embodiment, the saved configuration repository 150 may be split so that each group, user, or settings category can have its own history storage repository. By splitting the histories into smaller units (e.g., by user, group, settings category), they become faster to read and update.

Also, when an updated is required, only the part directly bound to a specific user/group/setting category will need to be updated.

To avoid uncontrolled growth, the history module 140 may only be updated if at least a change occurred and that change will overwrite previously processed and stored value(s). This change may include updates, for example.

Such a design allows the history module 140 to maintain a constant size in the saved configuration repository 160 for a specified configuration. This advantageously ensures that saved configurations do not grow through time and numerous executions.

Then, when configuring a user workspace, a lot of challenges may be faced. A user's directory, such as a Microsoft Active Directory, could be slow to answer, thus delaying user's groups retrieval, network resources (network drives, network printers, etc.) can timeout, resulting in extensive delays while trying to process actions related to them.

Most solutions for configuring user workspaces process every task/setting every time to ensure consistency, but this results in higher computing resource usage and higher execution delays.

The processing module 120, as discussed below, anticipates potential failures and avoids timeouts or delays. In one embodiment, the processing module 120 utilizes the history module 140 to process only changes or repair existing issues (self-healing) if necessary. The processing module 120 will process tasks/settings assigned to users, groups or machines. Furthermore, these settings can be assigned with a context filter (i.e., a condition or rule specifying, for example, "execute this task/setting only when user is connected to a Windows 10 workstation but not if connected to a Windows 7 workstation").

The processing module 120 utilizes the computing module 130 to process its tasks/settings. The settings may be split into categories, and all categories may be processed synchronously following a logical order unless specified differently in a central configuration. The purpose of this ordering is to ensure that categories are logically processed from a workspace environment configuration point of view. For example, the ordering might specify that files are copied before a shortcut that requires them to be copied is created.

Some categorizes that the processing module 120 uses the computing module 130 to schedule include: tasks/settings assigned to users or groups that can have a priority level (order); and tasks/settings having a specified execution order. Groups/users will thus be processed using the computing module 130. For each group/user, assigned tasks/settings will also be processed using the computing module 130.

The specific ordered processing allows the highest possible level of parallelism while respecting priorities and execution orders while being system resources conservative. Thus, from an end user perspective, even a large number of tasks/settings can be configured within a few seconds instead of minutes.

The processing module 120 will also utilize the history module 140 to store its previous execution details, for example, in the saved configuration repository 150.

The processing module 120 need not reprocess any already processed task/setting unless required for some specific reason, such as modifying a central configuration and a setting has been changed, updated or removed. The required update will be processed. Also, if self-healing has been specified in the configuration, then the processing module 120 will check the integrity of the action/setting and reprocess it only if needed. Also, if the workspace context has changed and the task/setting was bound to a specified context through a filter, then if a reverse action is possible and the configuration specifies it, the processing module 120 will remove the task/setting (e.g., disconnection of a network device, such as a printer or driver, removal of a desktop shortcut, etc.).

More particularly, if the new task or setting includes mapping a network device to the computer processing system 100, then the workspace environment management engine 110 is further configured to perform the following: determine if the network device is available; if the network device is available, then map the network printer to the computer processing system 100; and if the network device is not available, then do not attempt to map the network device to the computer processing system 100.

As noted above, the new task or setting may have a condition associated therewith. In this case, the workspace environment management engine 110 is further configured to perform the following: determine if the condition associated with the new task or setting has been met, and if the condition has been met, then perform the new task or setting.

The list of workspace tasks and settings in the engine configuration repository 150 may include a user group list of workspace tasks and settings and a default list of workspace tasks and settings. The workspace environment management engine 110 is further configured to determine if a directory service is available to the computer processing system 100, with the directory service including user group memberships. The directory service is accessed if available. The workspace environment management engine 110 is further configured to determine if a user that opened the user session has a user group membership in the directory service. If the user has a user group membership, then the user group list of workspace tasks and settings for the compare and identify functions is used. Otherwise, if the user has does not have a user group membership, then the default list of workspace tasks and settings is used for the compare and identify functions.

As highlighted above, the processing module 120 advantageously may only process changes to existing workspace configurations without having to clear and reconfigure an entire workspace. This technique will allow the workspace environment management engine 110 to be as fast as possible.

However, the workspace environment management engine 110 could be slowed down by delays while trying to retrieve its central configuration. To avoid such an issue, a timeout can be specified. The processing module 120 will try to contact its central configuration asynchronously and will fall back to a cached copy if the specified timeout is exceeded, thus avoiding entry into a timeout loop.

Since the workspace environment management engine 110 is the dedicated engine for user workspace settings, to work properly user group's membership need to be retrieved from a central directory, such as a Microsoft Active Directory. As the processing module 120 does not want to depend too much on delays in accessing the central directory, the processing module 120 should be able to retrieve a local (even if outdated) version of a user group's membership at a first group retrieval (e.g., in the saved configuration repository 160). Then, if the central directory is not answering with a configurable timeout delay, the processing module 120 will fall back using the local copy (user's token). While this could result in a small delay, it will guarantee that the workspace environment management engine 110 will not be affected by any important timeout contacting the directory services. Using the local user token ensures that the solution is as secured as the operating system itself.

When testing for file existence, connecting network resources, or printers for a workspace, the processing module 120 is likely to experience delays. These delays could be linked to a slow network or eventually a resource that is failing or not available anymore.

To avoid waiting until the timeout has expired to continue its processing the processing module 120 performs asynchronous checks before trying to process the related action. In one embodiment, this check tests access to the related network or file resource within a configurable timeout. If the test by the processing module 120 fails, the related resource will be considered as unavailable in the workspace configuration and the processing module 120 will not start to process it (and log the failure reason) to avoid entry of the timeout and allowing a real performance guarantee.

Figure 2:
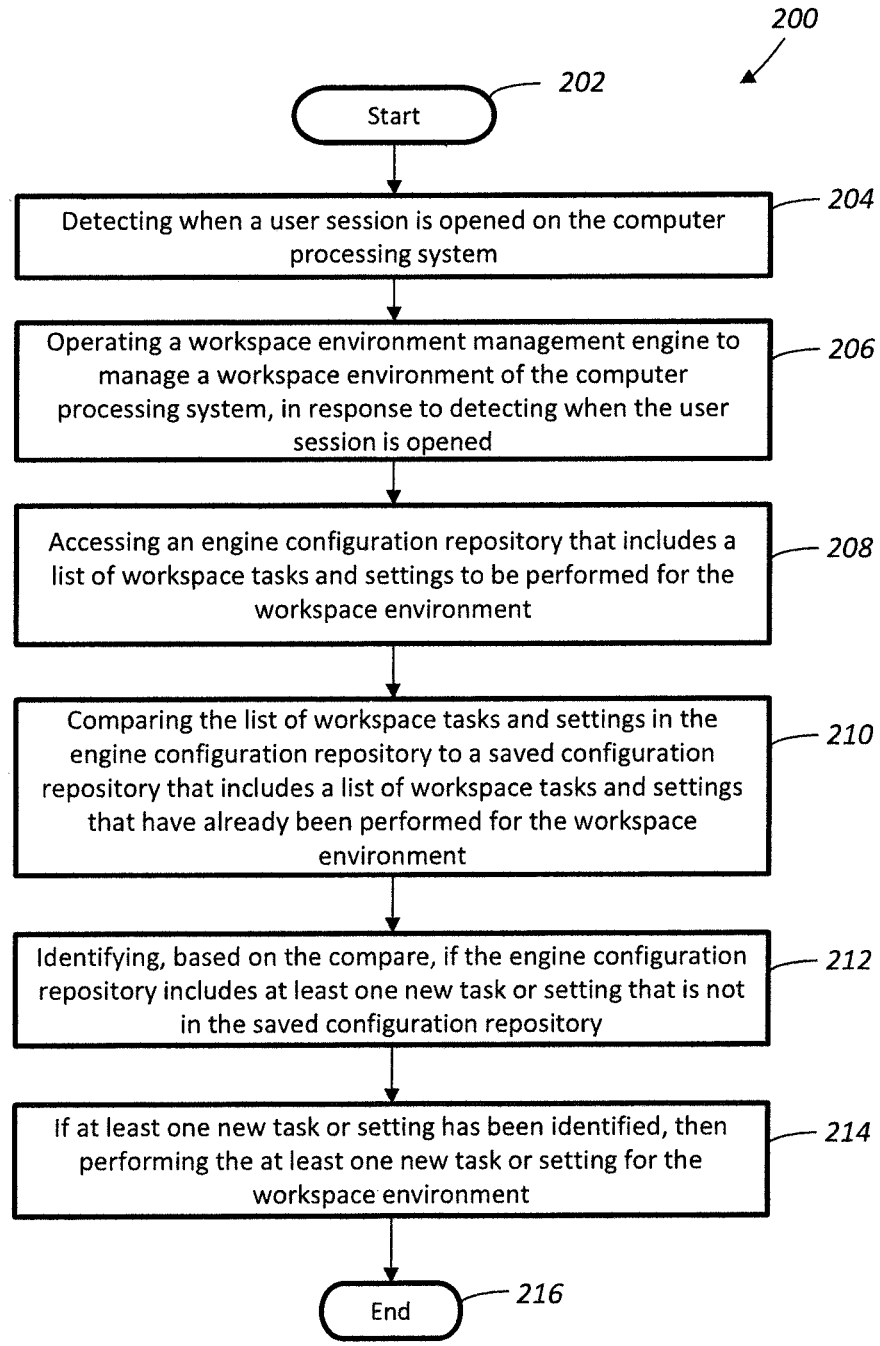
FIG. 2 is a flowchart illustrating a method for operating the computer processing system illustrated in FIG. 1.

Referring now to the flowchart 200 in FIG. 2, another aspect of the disclosure is directed to a method for operating a computer processing system 100 as described above. From the start (Bock 202), the method includes detecting when a user session is opened on the computer processing system 100 at Block 204, and operating a workspace environment management engine 110 at Block 206 to manage a workspace environment of the computer processing system 100, in response to detecting when the user session is opened. The method further includes at Block 208 accessing an engine configuration repository 150 that includes a list of workspace tasks and settings to be performed for the workspace environment. The list of workspace tasks and settings in the engine configuration repository 150 are compared at Block 210 to a saved configuration repository 160 that includes a list of workspace tasks and settings that have already been performed for the workspace environment. The method further includes identifying at Block 212, based on the compare, if the engine configuration repository 150 includes a new task or setting that is not in the saved configuration repository 160. If a new task or setting has been identified, then the new task or setting is be performed for the workspace environment at Block 214. The method ends at Block 216.

Yet another aspect is directed to a non-transitory computer readable memory for a computer processing system 100, with the non-transitory computer readable medium having a plurality of computer executable instructions for causing the computer processing system 100 to perform steps including operating a workspace environment management engine 110 to manage a workspace environment of the computer processing system 100, in response to detecting when the user session is opened. Operating the workspace environment management engine 110 includes accessing an engine configuration repository 150 that includes a list of workspace tasks and settings to be performed for the workspace environment, and comparing the list of workspace tasks and settings in the engine configuration repository 150 to a saved configuration repository 160 that includes a list of workspace tasks and settings that have already been performed for the workspace environment. The workspace environment management engine 110 identifies, based on the compare, if the engine configuration repository 150 includes a new task or setting that is not in the saved configuration repository 160. If a new task or setting has been identified, then the new task or setting is performed for the workspace environment.

Figure 3:
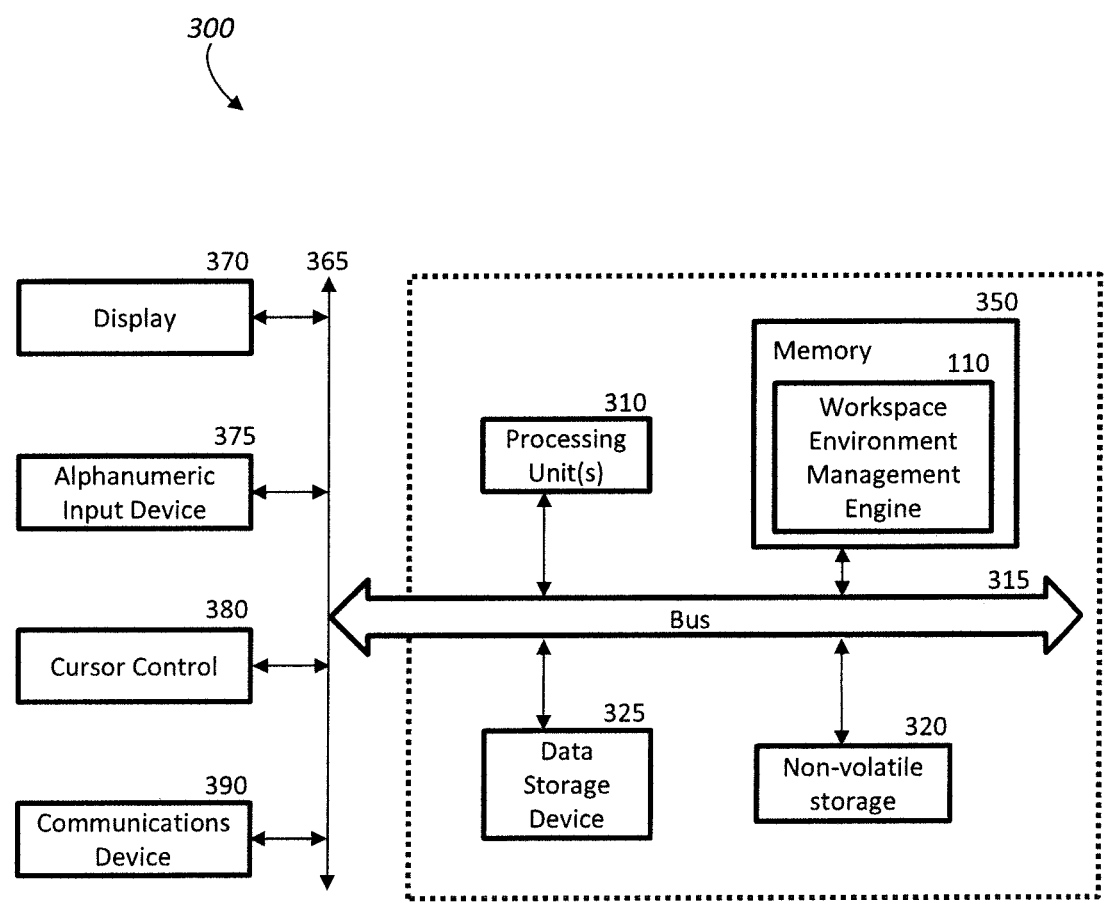
FIG. 3 is a more detailed block diagram of one embodiment of the computer processing system illustrated in FIG. 1.

FIG. 3 is one embodiment of a computer processing system 300 that may be used with the present disclosure. It will be apparent to those of ordinary skill in the art, however, that other alternative systems of various system architectures may also be used.

The computer processing system 300 includes a bus or other internal communication means 315 for communicating information, and a processor 310 coupled to the bus 315 for processing information. The system further comprises a random access memory (RAM) or other volatile storage device 350 (referred to as memory), coupled to bus 315 for storing information and instructions to be executed by processor 310.

A main memory 350 also may be used for storing temporary variables or other intermediate information during execution of instructions by processor 310. The system also comprises a read only memory (ROM) and/or static storage device 320 coupled to bus 315 for storing static information and instructions for processor 310, and a data storage device 325 such as a magnetic disk or optical disk and its corresponding disk drive. Data storage device 325 is coupled to bus 315 for storing information and instructions.

The system may further be coupled to a display device 370, such as a liquid crystal display (LCD), coupled to bus 315 through bus 365 for displaying information to a computer user. An alphanumeric input device 375, including alphanumeric and other keys, may also be coupled to bus 315 through bus 365 for communicating information and command selections to processor 310. An additional user input device is cursor control device 380, such as a touchpad, mouse, a trackball, stylus, or cursor direction keys coupled to bus 315 through bus 365 for communicating direction information and command selections to processor 310, and for controlling cursor movement on display device 370.

Another device, which may optionally be coupled to computer system 300, is a communication device 390 for accessing other nodes of a distributed system via a network. The communication device 390 may include any of a number of commercially available networking peripheral devices such as those used for coupling to an Ethernet, token ring, Internet, or wide area network. The communication device 390 may further be a null-modem connection, or any other mechanism that provides connectivity between the computer system 300 and the outside world. Note that any or all of the components of this system illustrated in FIG. 3 and associated hardware may be used in various embodiments of the present disclosure.

It will be appreciated by those of ordinary skill in the art that any configuration of the system may be used for various purposes according to the particular implementation. The control logic or software implementing the present disclosure can be stored in main memory 350, mass storage device 325, or other storage medium locally or remotely accessible to processor 310. For illustration purposes, the workspace environment management engine 110 is in the main memory 350. The main memory 350 may also include the operating system 104 and the shell 106.

It will be apparent to those of ordinary skill in the art that the system, method, and process described herein can be implemented as software stored in main memory 350 or read only memory 320 and executed by processor 310. This control logic or software may also be resident on an article of manufacture comprising a computer readable medium having computer readable program code embodied therein and being readable by the mass storage device 325 and for causing the processor 310 to operate in accordance with the methods and teachings herein.

It is to be understood that the above description is intended to be illustrative, and not restrictive. Many other embodiments will be apparent to those of skill in the art upon reading and understanding the above description. The scope of the disclosure should, therefore, be determined with reference to the appended claims, along with the full scope of equivalents to which such claims are entitled.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the disclosure and its practical applications, to thereby enable others skilled in the art to best utilize the disclosure and various embodiments with various modifications as may be suited to the particular use.

That which is claimed:

1. A computer processing system comprising:
    at least one processor configured to access a remote computing session providing a desktop on the computer processing system, with the desktop including a workspace to allow a user of the computer processing system to access applications and resources of the computer processing system that are associated with the workspace; and
    a workspace management engine configured to manage the workspace, in response to detecting when the remote computing session is opened by the user, by performing the following:
        access a saved configuration repository, in response to the remote computing session being opened by the user, that includes settings, of the applications and resources, that have already been successfully performed for the workspace, with the settings each having conditions associated therewith that have been satisfied,
        access a workspace configuration repository that includes customized settings, of the applications and resources, for the workspace, with the customized settings for the user and also each having conditions associated therewith,
        compare the customized settings to the settings that have already been successfully performed for the workspace,
        identify, based on the compare, that the workspace configuration repository includes at least one customized setting that is not in the saved configuration repository, with the at least one identified customized setting corresponding to at least one new setting that needs to be performed, and
        perform the at least one new setting for the workspace while not performing the settings that have already been successfully performed for the workspace, with the at least one new setting having a condition associated therewith that has been satisfied and store the performed at least one new setting into the saved configuration repository.

2. The computer processing system according to claim 1 wherein said workspace management engine comprises a history module configured to update the saved configuration repository with the at least one new setting in response to the condition associated therewith being satisfied.

3. The computer processing system according to claim 2 wherein said history module is further configured to perform the compare and identify functions of said workspace management engine.

4. The computer processing system according to claim 1 wherein said workspace management engine further comprises:
    a processing module configured to receive the at least one new setting to be performed; and
    a computing module configured to process multiple threads in parallel so as to perform the at least one new setting, with said computing module having a cap limit on how many threads can be processed in parallel.

5. The computer processing system according to claim 4 wherein the at least one new setting to be performed comprises a plurality of new settings to be performed; and wherein said computing module is further configured to schedule processing of the multiple threads for the plurality of new settings to be performed based on the cap limit.

6. The computer processing system according to claim 1 wherein the workspace configuration repository is located remotely from the computer processing system.

7. The computer processing system according to claim 1 wherein the at least one new setting includes updates to the settings stored in the workspace configuration repository.

8. The computer processing system according to claim 1 wherein the at least one new setting comprises mapping a network device to the computer processing system; and wherein said workspace management engine is further configured to perform the following:
    determine if the network device is available;
    if the network device is available, then map a network printer to the computer processing system; and
    if the network device is not available, then do not attempt to map the network device to the computer processing system.

9. The computer processing system according to claim 1 wherein the customized settings in the workspace configuration repository include a user group list of settings and a default list of settings; and wherein said workspace management engine is further configured to perform the following:
    determine if a directory service is available to the computer processing system, with the directory service including user group memberships;
    access the directory service if available;
    determine if a user that opened the user session has a user group membership in the directory service;
    if the user has a user group membership, then use the user group list of settings for the compare and identify functions; and
    if the user has does not have a user group membership, then use the default list of settings for the compare and identify functions.

10. A method for operating a computer processing system comprising:
    accessing a remote computing session providing a desktop on the computer processing system, with the desktop including a workspace to allow a user of the computer processing system to access applications and resources of the computer processing system that are associated with the workspace;
    detecting when the remote computing session is opened by the user; and
    managing the workspace, in response to detecting when the remote computing session is opened, by performing the following:

accessing a saved configuration repository, in response to the remote computing session being opened by the user, that includes settings, of the applications and resources, that have already been successfully performed for the workspace, with the settings each having conditions associated therewith that have been satisfied, accessing a workspace configuration repository that includes customized settings, of the applications and resources, for the workspace, with the customized settings for the user and also each having conditions associated therewith, comparing the customized settings to the settings that have already been successfully performed for the workspace, identifying, based on the compare, that the workspace configuration repository includes at least one customized setting that is not in the saved configuration repository, with the at least one identified customized setting corresponding to at least one new setting that needs to be performed, and performing the at least one new setting for the workspace while not performing the settings that have already been successfully performed for the workspace, with the at least one new setting having a condition associated therewith that has been satisfied and store the performed at least one new setting into the saved configuration repository.

11. The method according to claim 10 further comprising updating the saved configuration repository with the at least one new setting in response to the condition associated therewith being satisfied.

12. The method according to claim 10 wherein the computer processing system comprises a processing module and a computing module, the method further comprising:

operating the processing module to receive the at least one new setting to be performed; and operating the computing module to process multiple threads in parallel so as to perform the at least one new setting, with the computing module having a cap limit on how many threads can be processed in parallel.

13. The method according to claim 12 wherein the at least one new setting to be performed comprises a plurality of new settings to be performed; and wherein operating the computing module further comprises scheduling processing of the multiple threads for the plurality of new tasks or settings to be performed based on the cap limit.

14. The method according to claim 10 wherein the workspace configuration repository is located remotely from the computer processing system.

15. A non-transitory computer readable medium for a computer processing system, with the non-transitory computer readable medium having a plurality of computer executable instructions for causing the computer processing system to perform steps comprising:

accessing a remote computing session providing a desktop on the computer processing system, with the desktop including a workspace to allow a user of the computer processing system to access applications and resources of the computer processing system that are associated with the workspace;

detecting when the remote computing session is opened by the user; and managing the workspace, in response to detecting when the remote computing session is opened, by performing the following:

accessing a saved configuration repository, in response to the remote computing session being opened by the user, that includes settings, of the applications and resources, that have already been successfully performed for the workspace, with the settings each having conditions associated therewith that have been satisfied, accessing a workspace configuration repository that includes customized settings, of the applications and resources, for the workspace, with the customized settings for the user and also each having conditions associated therewith, comparing the customized settings to the settings that have already been successfully performed for the workspace, identifying, based on the compare, that the workspace configuration repository includes at least one customized setting that is not in the saved configuration repository, with the at least one identified customized setting corresponding to at least one new setting that needs to be performed, and performing the at least one new setting for the workspace while not performing the settings that have already been successfully performed for the workspace, with the at least one new setting having a condition associated therewith that has been satisfied and store the performed at least one new setting into the saved configuration repository.

16. The non-transitory computer readable medium according to claim 15 further comprising updating the saved configuration repository with the at least one new setting in response to the condition associated therewith being satisfied.

17. The non-transitory computer readable medium according to claim 15 wherein computer processing system comprises a processing module and a computing module; and wherein the steps to be performed further comprise:

operating the processing module to receive the at least one new setting to be performed; and operating the computing module to process multiple threads in parallel so as to perform the at least one new setting, with the computing module having a cap limit on how many threads can be processed in parallel.

18. The non-transitory computer readable medium according to claim 17 wherein the at least one new setting to be performed comprises a plurality of new settings to be performed; and wherein operating the computing module further comprises scheduling processing of the multiple threads for the plurality of new settings to be performed based on the cap limit.

\* \* \* \* \*